US008904606B2

(12) United States Patent
Aldrich et al.

(10) Patent No.: US 8,904,606 B2
(45) Date of Patent: Dec. 9, 2014

(54) CORD GRIPPING MECHANISM AND METHOD

(75) Inventors: Alvah Benjamin Aldrich, Geneva, NY (US); Pedro Rivera Romano, México City (MX)

(73) Assignee: Cooper Technologies Company, Houston, TX (US)

( * ) Notice: Subject to any disclaimer, the term of this patent is extended or adjusted under 35 U.S.C. 154(b) by 167 days.

(21) Appl. No.: 13/163,525

(22) Filed: Jun. 17, 2011

(65) Prior Publication Data
US 2012/0317755 A1   Dec. 20, 2012

(51) Int. Cl.
 *F16G 11/00* (2006.01)
(52) U.S. Cl.
 USPC ........................................ 24/135 R; 248/74.4
(58) Field of Classification Search
 USPC ......... 269/268, 262; 248/74.1, 74.4, 68.1, 62, 248/67.7, 229.1, 229.2; 439/462, 785; 403/374.3, 289, 290, 388, 398, 390; 285/367; 24/115 R, 135 R–135 N, 20 LS, 24/275–277, 279, 284, 336, 339; 174/82, 174/154–155, 657
 See application file for complete search history.

(56) References Cited

U.S. PATENT DOCUMENTS

| 563,040 | A | * | 6/1896 | Jackson | 269/268 |
| 841,165 | A | * | 1/1907 | Meech | 403/396 |
| 1,187,430 | A | * | 6/1916 | Kenly | 24/275 |
| 2,891,296 | A | * | 6/1959 | Darde | 403/391 |
| 3,393,393 | A | * | 7/1968 | Hart | 439/523 |
| 3,848,956 | A | * | 11/1974 | Kraft | 439/411 |
| 3,856,244 | A | * | 12/1974 | Menshen | 248/67.5 |
| 4,143,446 | A | * | 3/1979 | Down | 24/115 R |
| 4,764,131 | A | * | 8/1988 | Beinhaur | 439/781 |
| 5,014,941 | A | * | 5/1991 | Sherman | 248/74.4 |
| 5,157,814 | A | * | 10/1992 | Mann | 24/135 R |
| 6,561,466 | B1 | * | 5/2003 | Myers et al. | 248/74.4 |
| 7,186,047 | B2 | * | 3/2007 | Soppelsa et al. | 403/106 |

* cited by examiner

*Primary Examiner* — Robert J Sandy
*Assistant Examiner* — Abigail Morrell
(74) *Attorney, Agent, or Firm* — King & Spalding LLP

(57) ABSTRACT

A gripping device for gripping a cable and having a first jaw with a first gripping element, a second jaw with a second gripping element, and at least one fastener for fastening the first and second jaws to each other. At least one of the first and second gripping elements has a configuration that makes at least two points of contact with the cable. A system for gripping a cable and having a gripping device fastened to a support structure, where the gripping device has a first jaw with a first gripping element, a second jaw with a second gripping element, and at least one fastener for fastening the first and second jaws to each other. At least one of the first and second gripping elements has a configuration that makes at least two points of contact with the cable.

15 Claims, 9 Drawing Sheets

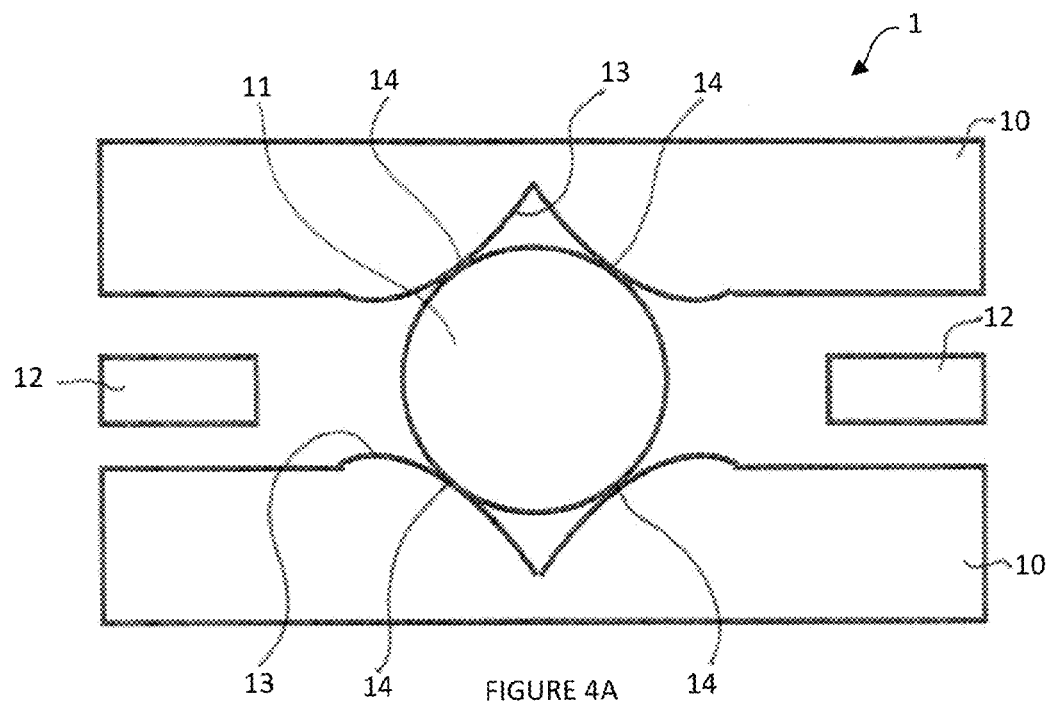
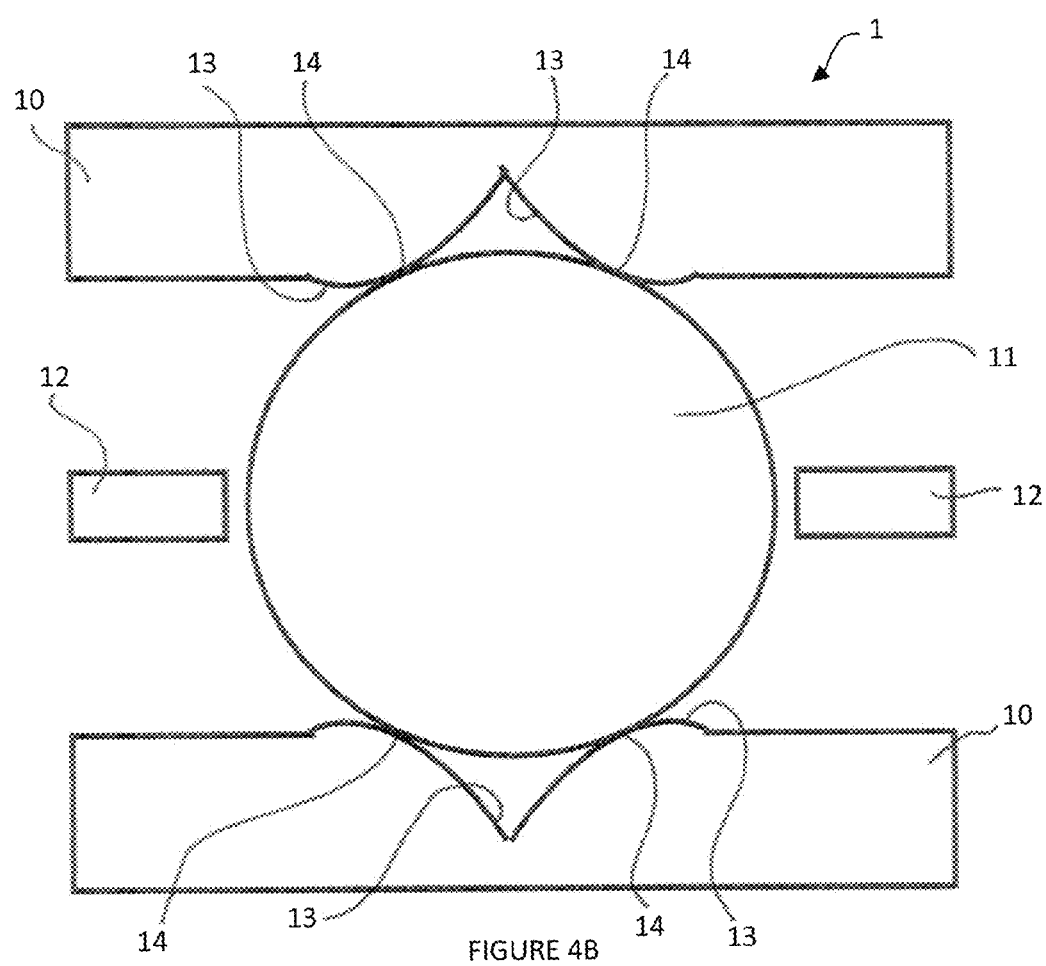

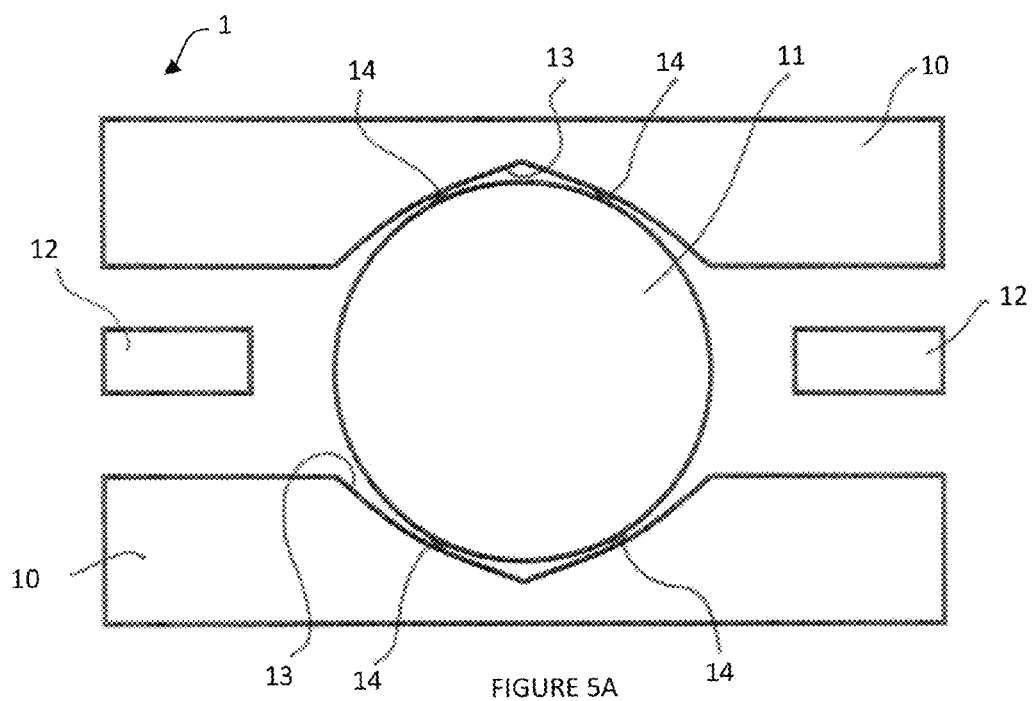
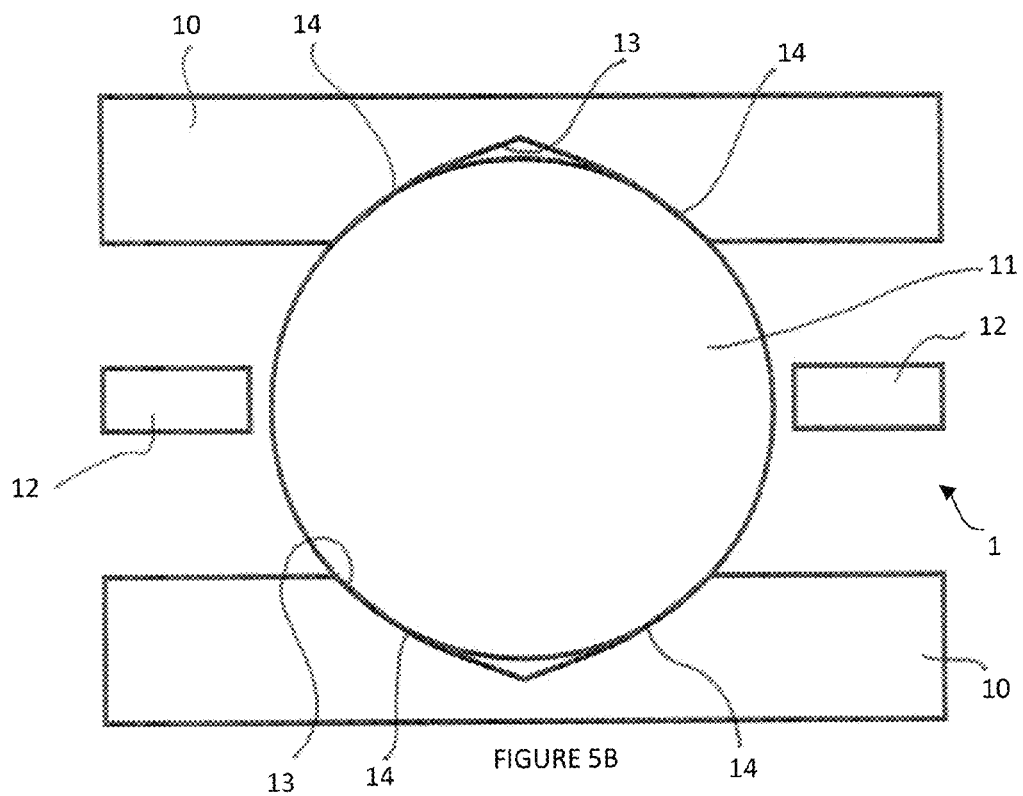

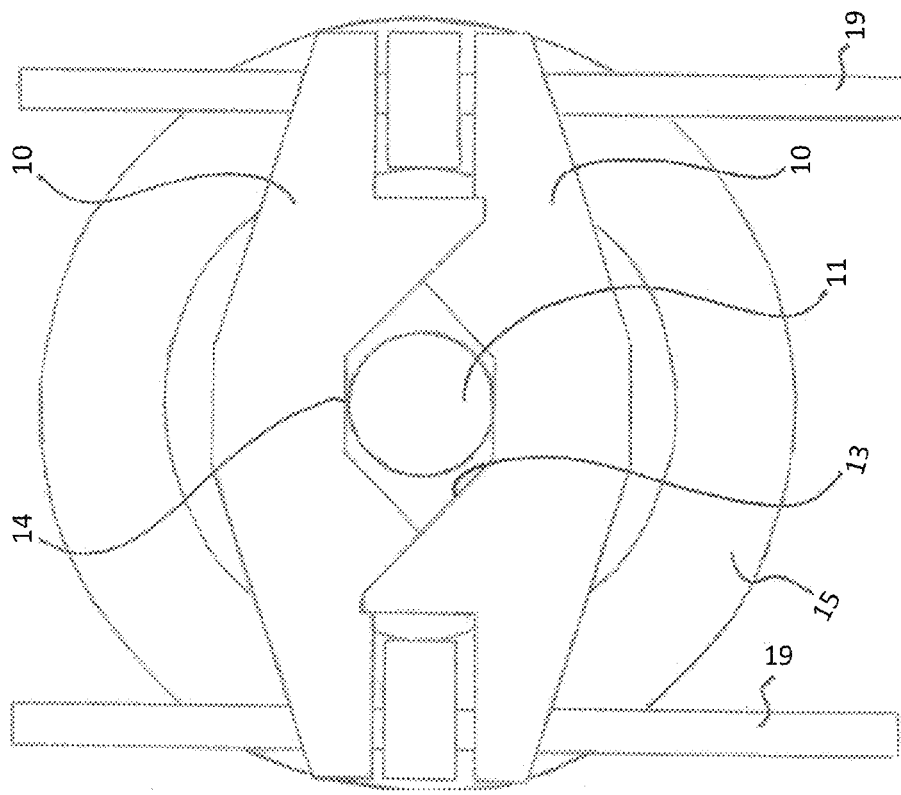
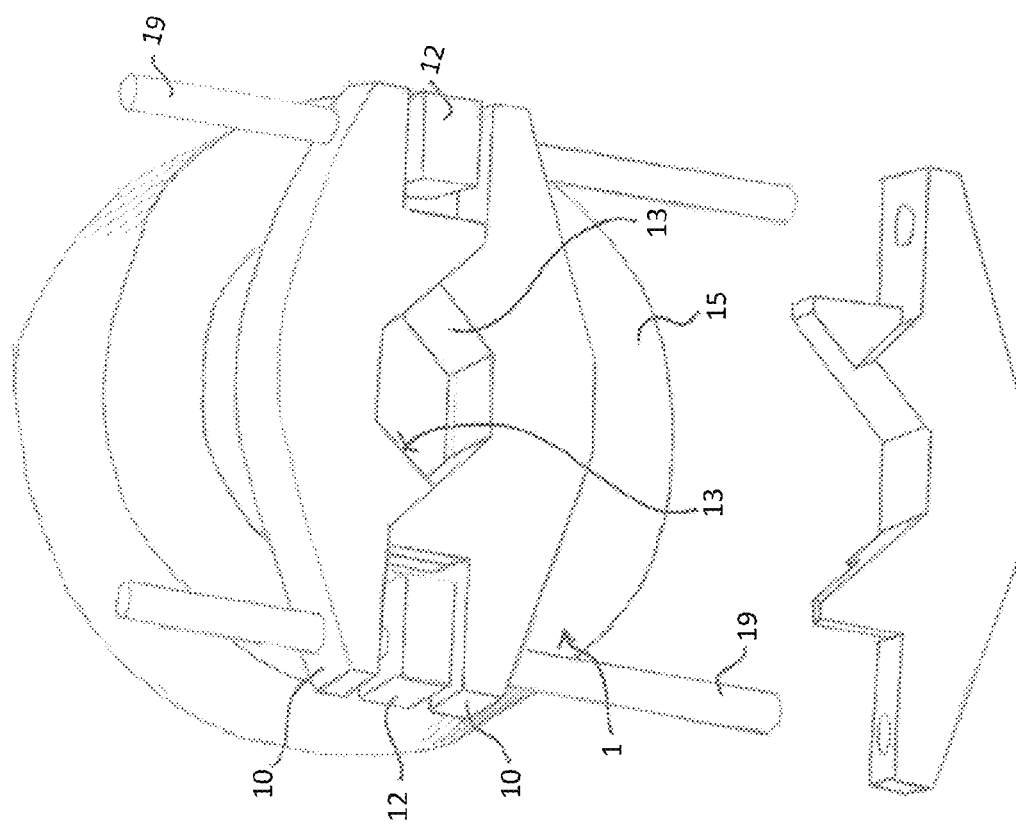
FIGURE 8A
FIGURE 8B

CORD GRIPPING MECHANISM AND METHOD

TECHNICAL FIELD

The present disclosure relates generally to cable connectors, and more particularly to methods and devices for gripping a cable.

BACKGROUND

Several devices exist for gripping cables or cords, including gland nuts and clamping devices.

Gland nuts utilize gripping elements that can be tightened or loosened around a cable or cord using screwed fasteners (screws or bolts) for adjusting the gripping elements. For example, a gland nut device may include two or three gripping elements located around a circumference of the device and connected to each other by screwed fasteners, such that when the screwed fasteners are adjusted the gripping elements are either pulled toward each other (e.g., to clamp around a cable) or pushed away from each other (e.g., to release a cable). Such gland nut devices are prone to any problems associated with using screwed fasteners, such as screws or bolts, such as the screwed fasteners stripping out upon tightening or loosening. In addition, such gland nut devices require tools for tightening and loosening the gripping elements.

Clamping devices utilize a set of jaws to engage a cable. The jaws squeeze the cable between the jaws to grip the cable in the gripping elements of the jaws. For example, as shown in FIG. 1, oppositely facing jaws 10 are positioned on opposite sides of a cable 11. Flanges 12 are also positioned between the jaws 10, wherein the flanges 12 position the jaws relative to a gland nut (not shown). Each of the jaws 10 has a gripping element 13 for gripping the cable 11. The gripping elements 13 have a radius of curvature, such that the gripping elements 13 are concaved recesses in the jaws 10. As shown in FIG. 1, when the radius of curvature of the circumference of the cable 11 is smaller than the radius of curvature of the gripping elements 13, a single point of contact 14 exits between each gripping element 13 and the cable 11. As shown in FIG. 2A, when the radius of curvature of the circumference of the cable 11 is the same as the radius of curvature of the gripping elements 13, then contact exits across the entirety of each gripping element 13. Of course, contact across the entirety of each gripping element 13 may provide for a more secure grip of the cable 11 by the gripping elements 13 of the jaws 10. However, only one cable diameter "fits" in the gripping elements 13. Further, as shown in FIG. 2B, if the jaws 10 become displaced relative to each other (directions of arrows), then a perfect fit between the cable 11 and the gripping elements 13 of the jaws 10 is lost. In particular, single points of contact 14 then exist between the cable 11 and the gripping elements 13 of the jaws 10.

SUMMARY

In accordance with the teachings of the present disclosure, disadvantages and problems associated with existing cable gripping devices have been reduced.

According to one aspect of the invention, a device for gripping a cable. There is provided a gripping device for gripping a cable, comprising: a first jaw comprising a first gripping element, a second jaw comprising a first gripping element, and at least one fastener for fastening the first and second jaws to each other, wherein at least one of the first and second gripping elements comprises a configuration that makes at least two points of contact with the cable.

A further aspect of the invention provides a system for gripping a cable. The system includes a gripping device fastened to a support structure, wherein the gripping device comprises a first jaw comprising a first gripping element, a second jaw comprising a first gripping element, and at least one fastener for fastening the first and second jaws to each other, wherein at least one of the first and second gripping elements comprises a configuration that makes at least two points of contact with the cable.

Still another aspect of the invention provides a method for gripping a cable. There is provided a method for gripping a cable, comprising: positioning a cable through an opening in a gripping device including a first jaw comprising a first gripping element, a second jaw comprising a first gripping element, and at least one fastener for fastening the first and second jaws to each other, wherein at least one of the first and second gripping elements comprises a configuration that makes at least two points of contact with the cable; and tightening the at least one fastener to engage at least one of the first and second gripping elements with the cable.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4A illustrates an end view of a gripping device of the present invention, wherein the gripping surface comprises convex surfaces that form a bulging, v-shaped recess, and a relatively smaller diameter cable is engaged;

FIG. 4B shows the gripping device of FIG. 4A, wherein a relatively larger diameter cable is engaged;

FIG. 5A illustrates an end view of a gripping device of the present invention, wherein the gripping surface comprises two concave surfaces that form a sunken, v-shaped recess, and a relatively smaller diameter cable is engaged;

FIG. 5B shows the gripping device of FIG. 5A, wherein a relatively larger diameter cable is engaged;

FIG. 8A is a perspective view of an alternative embodiment of a gripping device fastened to a gland nut, wherein the jaws of the gripping device interlock;

FIG. 8B shows an end view of the gripping device of FIG. 8A, wherein a small diameter cable is engaged in the jaws;

DETAILED DESCRIPTION

Preferred embodiments and their advantages over the prior art are best understood by reference to FIGS. 3A-8D below. However, the present disclosure may be more easily understood in the context of a high level description of certain embodiments.

The disclosure relates to an improved device for gripping a cable or other similar object. As used herein, the term "cable" refers to any one or more electrical or non-electrical cable, cord, wire, conduit, shaft, rod, or other elongated object. In general, the cable gripping devices disclosed herein include gripping elements that make more than single points of contact with a range of cable diameters. For example, the gripping device may include oppositely facing jaws that are positioned on opposite sides of a cable. Each jaw may have a gripping element for gripping the cable 11. The gripping elements may have a surface structure that enable at least two points of contact with the cable. Because each gripping element has two points of contact, the jaws may have restricted opportunity to become offset relative to each other so that all points of contact with a cable may be maintained.

Figure 1:
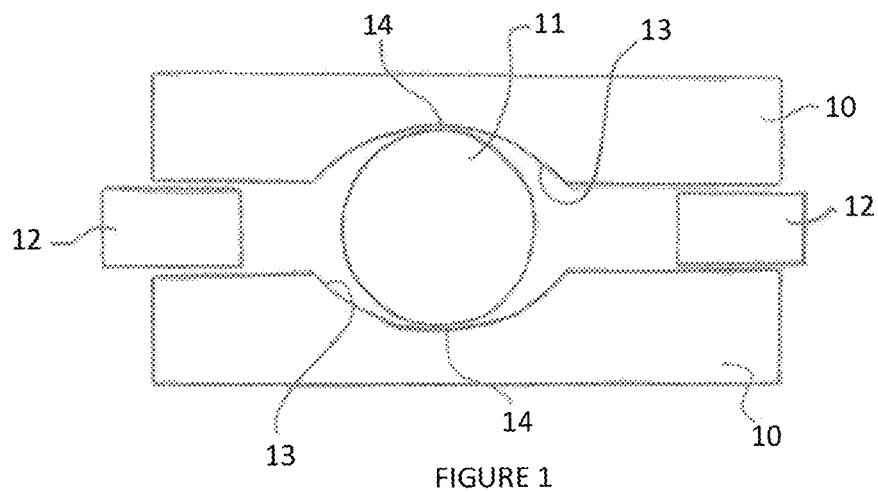
FIG. 1 illustrate a cross-sectional, end view of a prior art clamping device for gripping a cable, wherein the radius of curvature of the gripping elements are larger than the radius of curvature of the circumference of the cable.
Figure 2A:
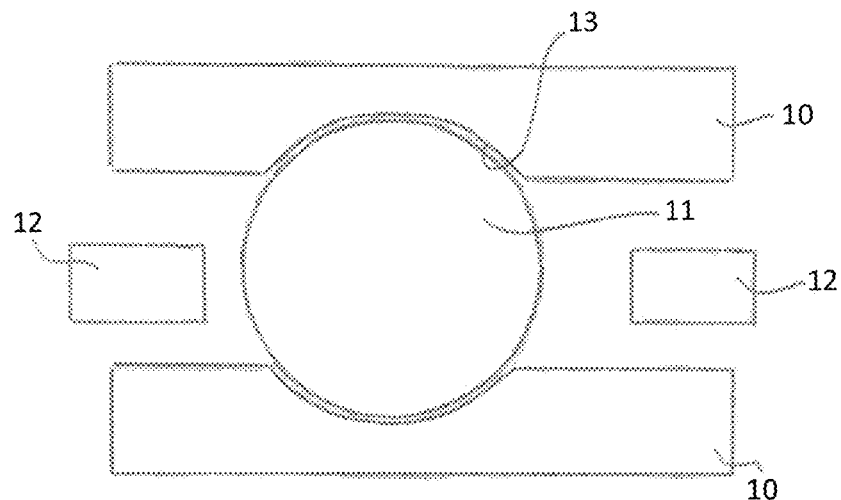
FIG. 2A illustrates a cross-sectional, end view of the prior art clamping device of FIG. 1, wherein the radius of curvature of the gripping elements are the same as the radius of curvature of the circumference of the cable.
Figure 2B:
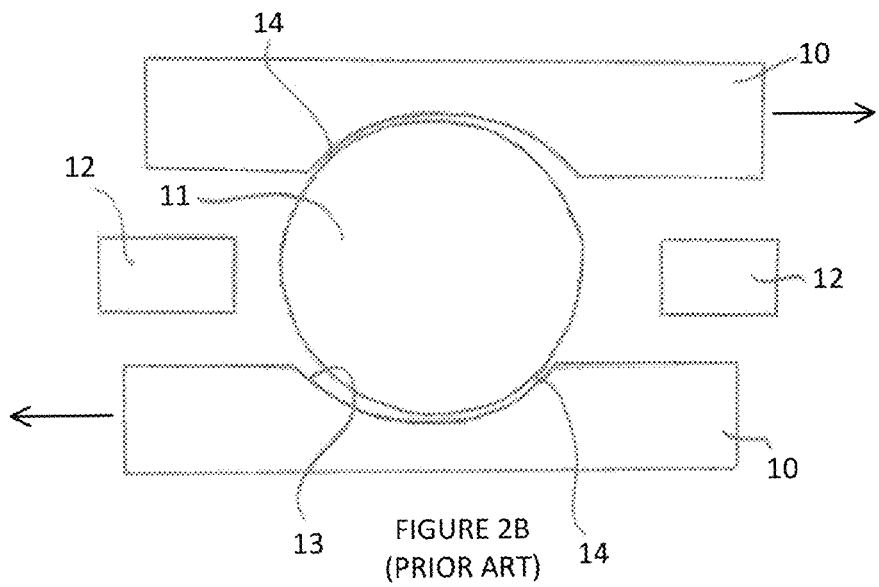
FIG. 2B illustrates the prior art clamping device of FIG. 2, wherein the jaws are displaced relative to each other such that single points of contact are made with the cable.
Figure 3A:
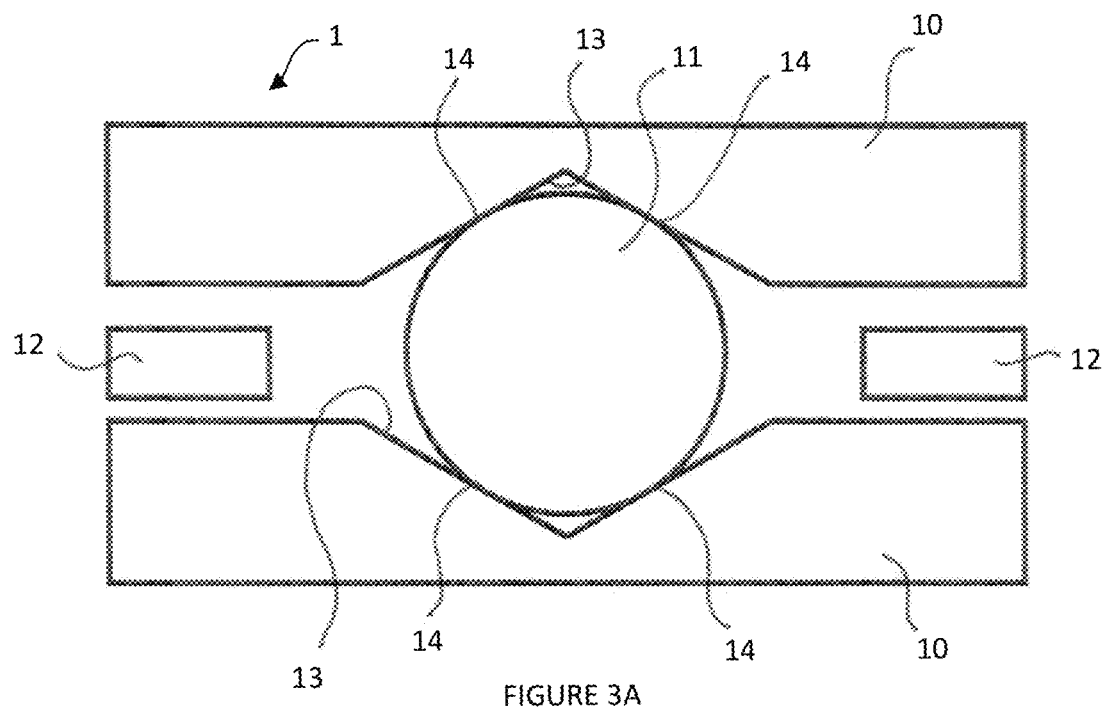
FIG. 3A illustrates an end view of a gripping device of the present invention, wherein the gripping surface comprises two flat surfaces for a v-shaped channel, and a relatively smaller diameter cable is engaged.
Figure 3B:
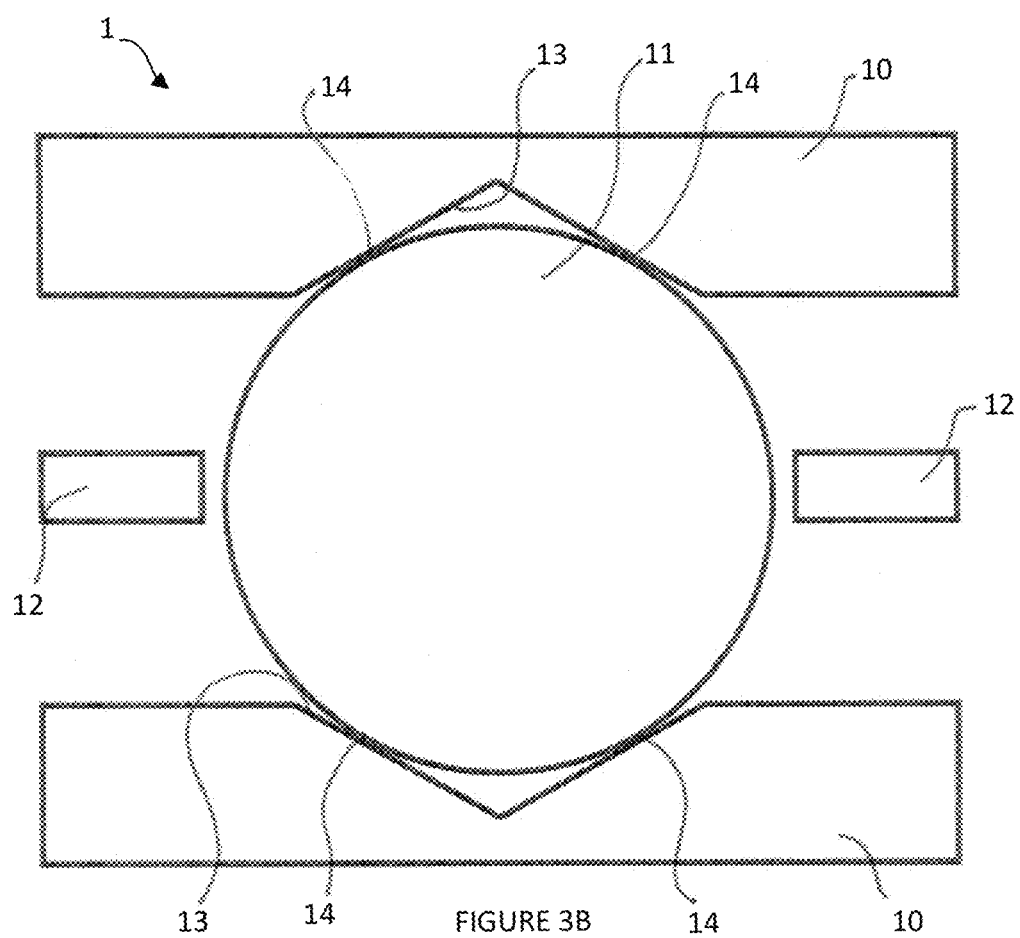
FIG. 3B shows the gripping device of FIG. 3A, wherein a relatively larger diameter cable is engaged.

FIGS. 3A and 3B illustrate an example cable gripping device. FIG. 3A is a cross-sectional, end view of the gripping device with a relatively smaller diameter cable gripped therein. FIG. 3B is a cross-sectional, end view of the gripping device shown in FIG. 3A, with a relatively larger diameter cable gripped therein. The gripping device 1 comprises two oppositely facing jaws 10. Flanges 12 are also positioned between the jaws 10, wherein the flanges 12 position the jaws relative to a gland nut (not shown). Additionally, fasteners (not shown) may be used to secure the jaws 10 to each other and to the flanges 12. Each jaw 10 has a gripping element 13 for engaging or gripping the cable 11. In this embodiment of the invention, each gripping element 13 comprises two flat surfaces that form a v-shaped recess in the jaw 10. With the cable positioned between the gripping elements 13, each gripping element makes two points of contact 14 with the cable 11. As shown in FIG. 3A, each gripping element makes two points of contact 14 with the cable 11 having a relatively smaller diameter. As shown in FIG. 3B, each gripping element makes two points of contact 14 with the cable 11 having a relatively larger diameter.

FIGS. 4A and 4B illustrate an example cable gripping device. FIG. 4A is a cross-sectional, end view of the gripping device with a relatively smaller diameter cable gripped therein. FIG. 4B is a cross-sectional, end view of the gripping device shown in FIG. 4A, with a relatively larger diameter cable gripped therein. The gripping device 1 comprises two oppositely facing jaws 10. Flanges 12 are also positioned between the jaws 10, wherein the flanges 12 position the jaws relative to a gland nut (not shown). Additionally, fasteners (not shown) may be used to secure the jaws 10 to each other and to the flanges 12. Each jaw 10 has a gripping element 13 for engaging or gripping the cable 11. In this embodiment of the invention, each gripping element 13 comprises two convex surfaces that form a bulging, v-shaped recess in the jaw 10. With the cable positioned between the gripping elements 13, each gripping element makes two points of contact 14 with the cable 11. As shown in FIG. 4A, each gripping element makes two points of contact 14 with the cable 11 having a relatively smaller diameter. As shown in FIG. 4B, each gripping element makes two points of contact 14 with the cable 11 having a relatively larger diameter.

FIGS. 5A and 5B illustrate an example cable gripping device. FIG. 5A is a cross-sectional, end view of the gripping device with a relatively smaller diameter cable gripped therein. FIG. 5B is a cross-sectional, end view of the gripping device shown in FIG. 5A, with a relatively larger diameter cable gripped therein. The gripping device 1 comprises two oppositely facing jaws 10. Flanges 12 are also positioned between the jaws 10, wherein the flanges 12 position the jaws relative to a gland nut (not shown). Additionally, fasteners (not shown) may be used to secure the jaws 10 to each other and to the flanges 12. Each jaw 10 has a gripping element 13 for engaging or gripping the cable 11. In this embodiment of the invention, each gripping element 13 comprises two concave surfaces that form a sunken, v-shaped recess in the jaw 10. With the cable positioned between the gripping elements 13, each gripping element makes two points of contact 14 with the cable 11. As shown in FIG. 5A, each gripping element makes two points of contact 14 with the cable 11 having a relatively smaller diameter. As shown in FIG. 5B, each gripping element makes two points of contact 14 with the cable 11 having a relatively larger diameter.

Figure 6A:
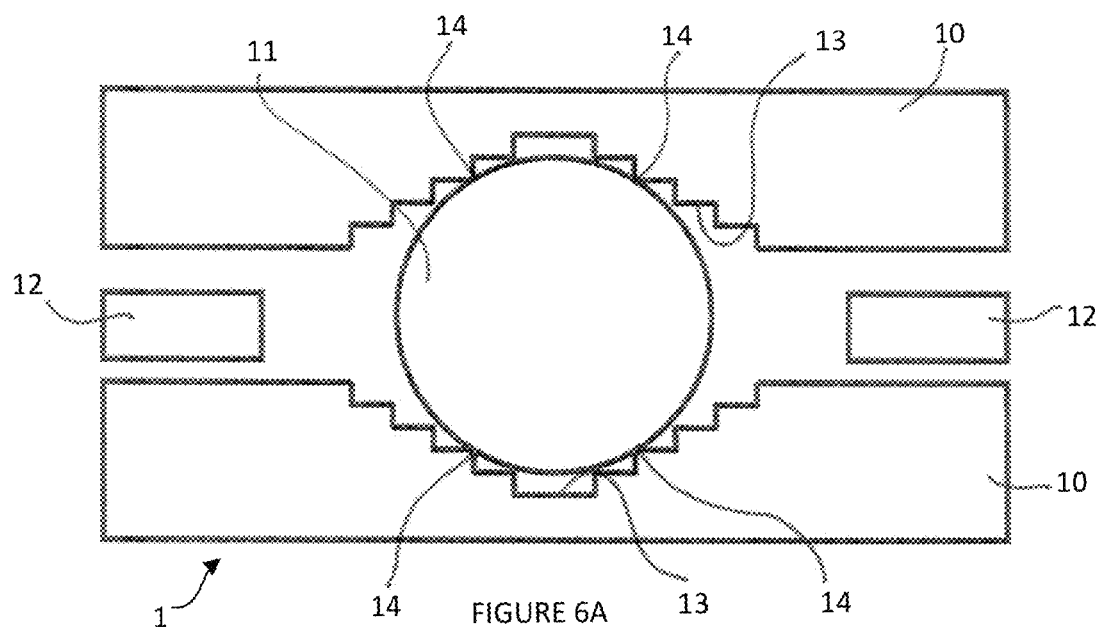
FIG. 6A illustrates an end view of a gripping device of the present invention, wherein the gripping surface comprises stepped surfaces that form a stepped recess, and a relatively smaller diameter cable is engaged.
Figure 6B:
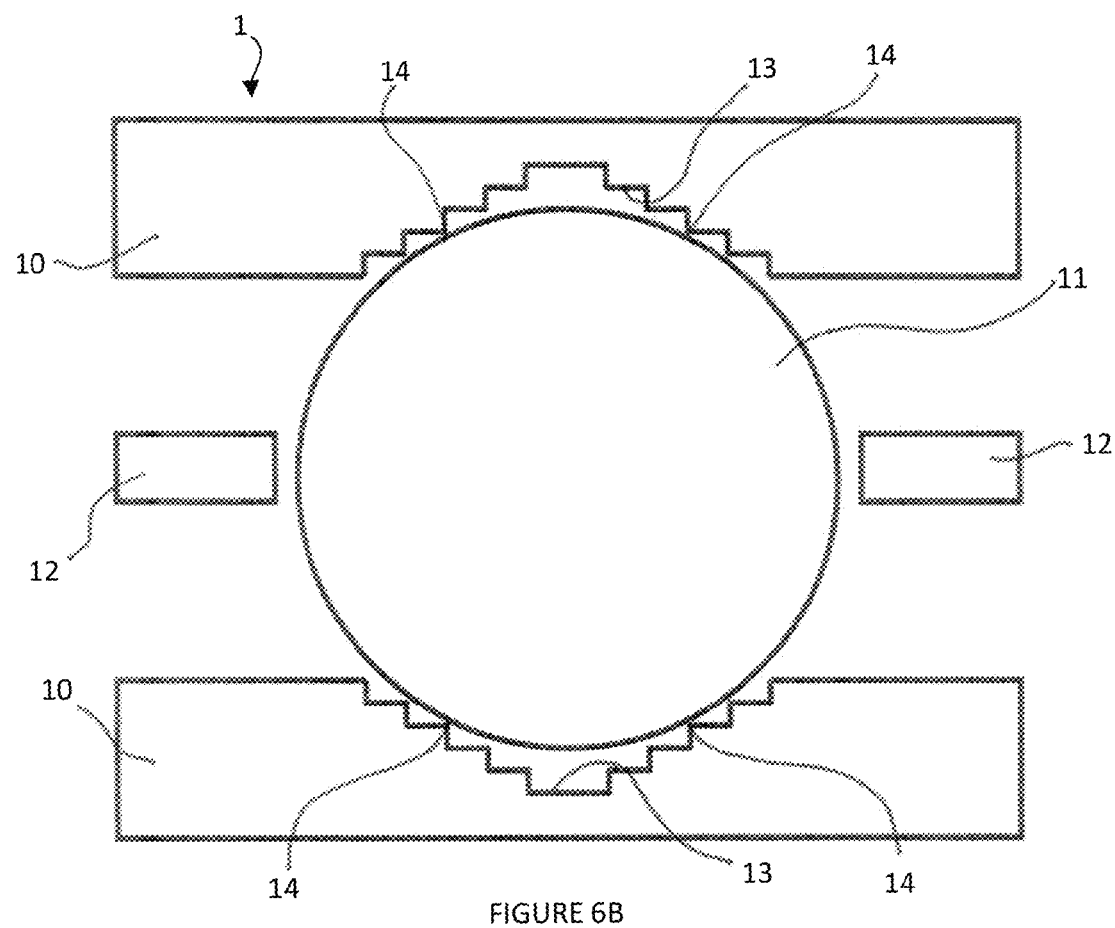
FIG. 6B shows the gripping device of FIG. 6A, wherein a relatively larger diameter cable is engaged.

FIGS. 6A and 6B illustrate an example cable gripping device. FIG. 6A is a cross-sectional, end view of the gripping device with a relatively smaller diameter cable gripped therein. FIG. 6B is a cross-sectional, end view of the gripping device shown in FIG. 6A, with a relatively larger diameter cable gripped therein. The gripping device 1 comprises two oppositely facing jaws 10. Flanges 12 are also positioned between the jaws 10, wherein the flanges 12 position the jaws relative to a gland nut (not shown). Additionally, fasteners (not shown) may be used to secure the jaws 10 to each other and to the flanges 12. Each jaw 10 has a gripping element 13 for engaging or gripping the cable 11. In this embodiment of the invention, each gripping element 13 comprises stepped surfaces that form a stepped recess in the jaw 10. With the cable positioned between the gripping elements 13, each gripping element makes two points of contact 14 with the cable 11. As shown in FIG. 6A, each gripping element makes two points of contact 14 with the cable 11 having a relatively smaller diameter. As shown in FIG. 6B, each gripping element makes two points of contact 14 with the cable 11 having a relatively larger diameter.

Figure 7A:
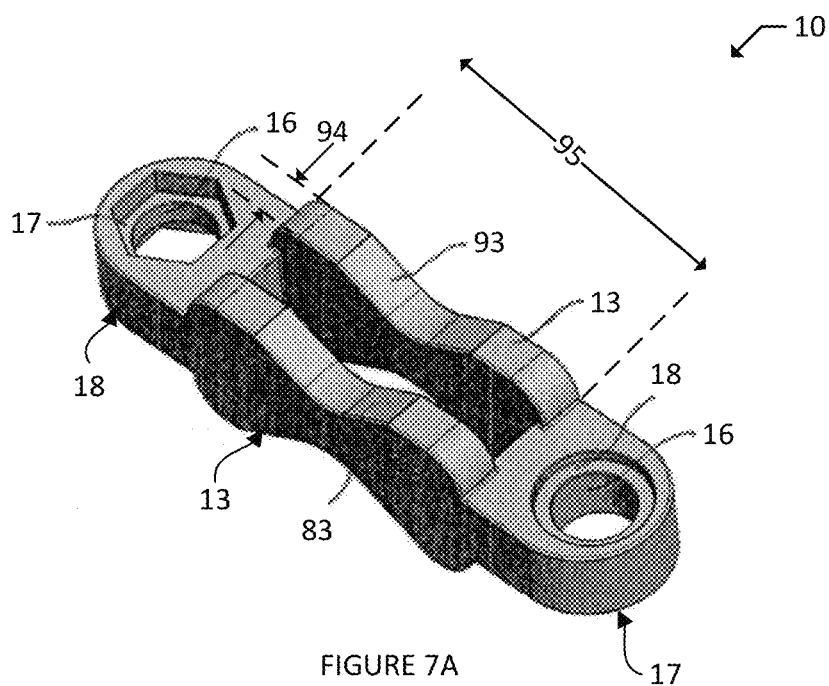
FIG. 7A is a perspective view of a jaw having two gripping elements.
Figure 7B:
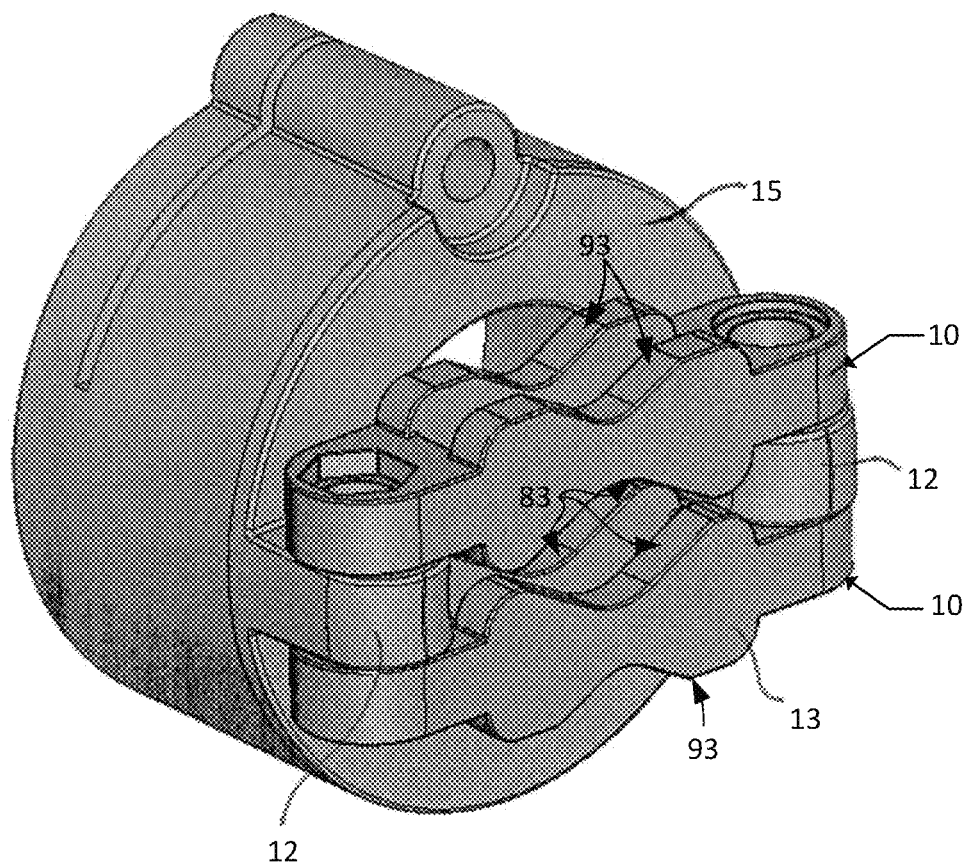
FIG. 7B is a perspective view of a gripping device fastened to a gland nut, wherein the gripping device has jaws that are the same as that illustrated in FIG. 7A.

A further illustrative embodiment is shown in FIGS. 7A and 7B. These figures show perspective views of a single jaw and a gripping device fastened to a gland nut, respectively. As best seen in FIG. 7B, a gland nut 15 is an annular structure with a hole in the middle sufficiently large to receive a cable (not shown). Two flanges 12 extend from opposite sides of the gland nut 15 in a direction parallel with a longitudinal central axis of the hole in the gland nut 15. Each flange 12 has a hole in it that extends in a direction transverse to the longitudinal central axis of the hole in the gland nut 15. Two jaws 10 are positioned at the opening of the hole in the middle of the gland nut 15.

Figure 7C:
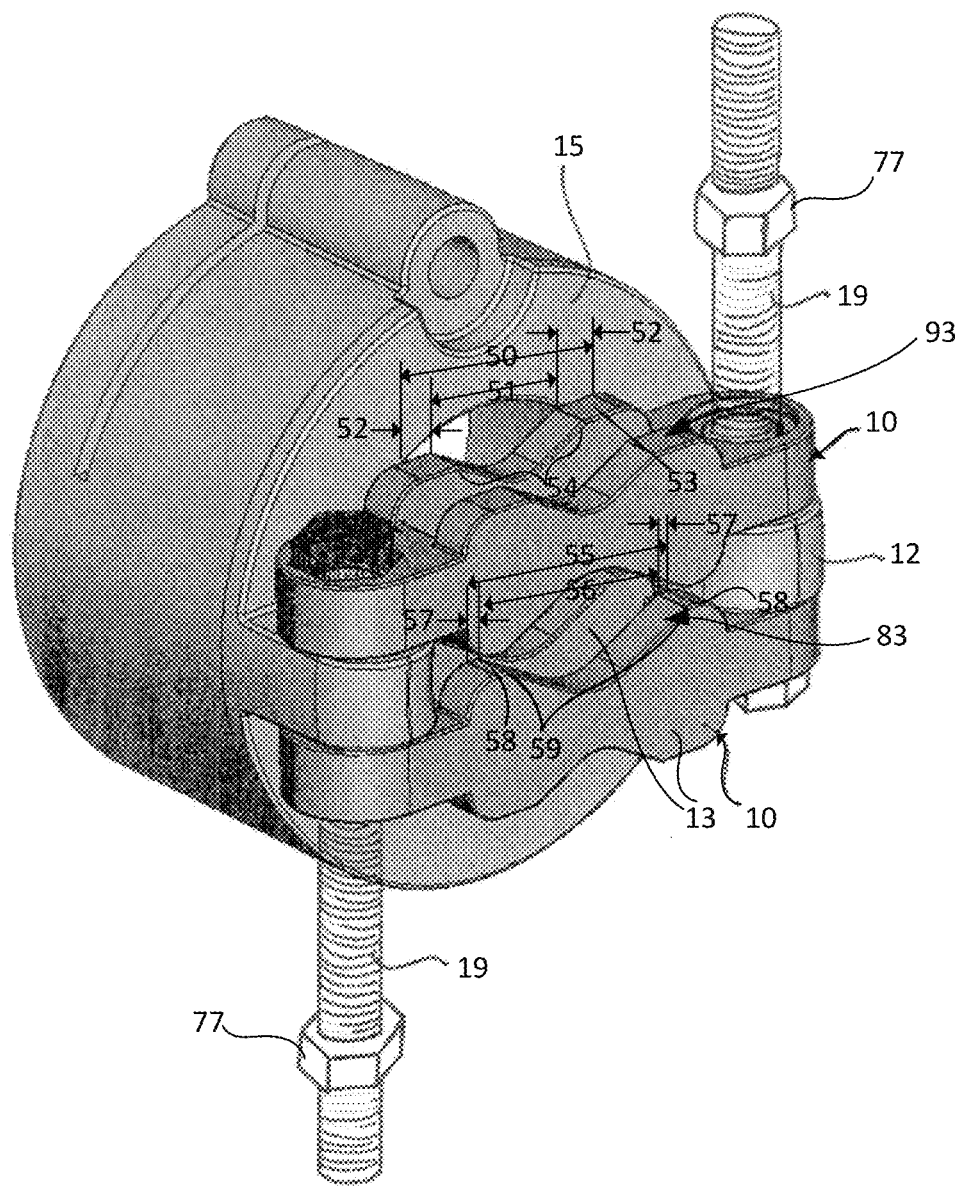
FIG. 7C is a perspective view of the gripping device and gland nut of FIG. 7B, wherein the fasteners are shown.

As shown in FIG. 7A, each jaw 10 has a fastening hole 16 at each end. One end of each fastening hole 16 has a hex head counter sink 17 for receiving and retaining a hex head of a bolt-type fastener or a hexagonal nut so as to prevent the fastener from rotating in the counter sink. The other end of each fastener hole 16 has a circular counter sink 18 for receiving and retaining a fastener head or nut in such a way to allow the fastener head or nut to rotate freely. As shown in FIGS. 7A and 7B, the orientation of the hex head counter sink 17 (e.g., top) and the circular counter sink 18 (e.g., bottom) on one end of the jaw 10 can be reversed (e.g., bottom and top, respectively) on the other end of the jaw 10. In the illustrated embodiment, each jaw 10 has two gripping elements 13 positioned substantially parallel to each other and having a continuous physical separation from each other such that the gripping elements 13 may engage a cable (not shown) in two separate places (also called a contact region 59, which includes the points of contact 14 described above with respect to, for example, FIG. 3A) along the longitudinal length of a cable. Each gripping element 13 has a gripping surface 93 on one side of the gripping element 13 and another gripping surface 83 on the opposite side of the gripping element 13. The shape of the gripping surface 83 can be substantially the same as the shape of the gripping surface 93 of a gripping element 13. Conversely, as shown in FIGS. 7A-7C, the shape of the gripping surface 83 can be different than or the same as the shape of the gripping surface 93 of a gripping element 13. Specifically, the gripping surfaces 83 shown in FIGS. 7A-7C have a wider (larger) arc to accommodate a larger cable size compared to the smaller arc of the gripping surfaces 93. In addition, each gripping surface (e.g., gripping surface 83, gripping surface 93) of a gripping element 13 has a width 94 and a length 95 that is substantially the same as the width and length of the other gripping surfaces of the gripping elements of the jaw 10. The length 95 of a gripping surface of a gripping element 13 is larger than the width 94 of the gripping surface of that gripping element 13. The gripping elements 13 are configured so as to make two points of contact with a cable. Thus, each jaw 10, as shown in FIG. 7A, is configured to make four points of contact with a cable (not shown).

In the embodiment shown, the jaw 10 is configured so as to be serviceable as both a "top" jaw and a "bottom" jaw, based in part on the gripping surface 93 and the gripping surface 83. Thus, there is no need to manufacture two different jaw configurations so as to make a jaw pair or set. Rather, two identical jaws 10 may be positioned opposite each other to be a fully functional jaw pair or set. To fasten two jaws together, the jaws are positioned adjacent each other so that the hex head counter sink 17 of one jaw 10 is aligned with the circular counter sink 18 of the other jaw 10. In this configuration, a standard hex head bolt and nut combination may be inserted through the fastening holes 16 at the ends of the jaws 10 to fastener the two jaws 10 together. The jaw 10 illustrated in FIG. 7A can be further constructed so that its top and bottom are identical so that no matter which way it is assembled in a jaw pair or set, it will be correct. In particular, the jaw 10 has two gripping elements 13 (each having a gripping surface 83 and a gripping surface 93) on the top (as shown in FIG. 7A) and two gripping elements 13 (each having a gripping surface 83 and a gripping surface 93) on the bottom, so that no matter which way it is assembled, a gripping surface from each of the two gripping elements 13 will engage a cable. Similarly, the jaw 10 has one hex head counter sink 17 and one circular counter sink 18 on the top (as shown in FIG. 7A), and it also has one hex head counter sink 17 and one circular counter sink 18 on the bottom, so that no matter which way the jaw 10 is assembled, counter sink holes are properly configured to engage with a fastener.

Referring again to FIG. 7B, the jaws 10 are fixable to the flanges 12 of the gland nut 15 by extending fasteners (not shown) through the fastening holes 16 of the jaws 10 and the holes in the flanges 12. The length of the fasteners (not shown) may be adjusted to allow the jaws 10 to be farther or closer to each other to accommodate a wide range of cable diameters. Further, as shown in FIG. 7B, each jaw is oriented such that the length 95 of the gripping elements 13 runs substantially perpendicular to the length of a cable disposed between gripping surfaces of the gripping elements 13. In other words, substantially the entire width of a portion of each gripping surface is in contact with the cable.

FIG. 7C provides a perspective view of the gripping device fastened to a gland nut shown in FIG. 7B, and further illustrates standard hex head bolt-type fasteners 19 inserted through the fastening holes 16 of the jaws 10 and the flanges 12. In alternative embodiments, any type of fastener known to persons of skill may be used. For example, the fastening holes 16 in the jaws may be threaded so that a threaded fastener may be threaded therein. In such a case, a hexagonal nut 77 can be seated in each hex head counter sink 17, and the head of the hex head bolt-type fastener 19 can be driven toward the circular counter sink 18 on the opposite side of the jaw 10. Alternatively, the holes in the flanges 12 may be threaded. As yet another alternative, as shown in FIG. 7C, the fastening holes 16 and the holes in the flanges 12 are not threaded, so that the head of the hex head bolt-type fastener 19 can be seated in each hex head counter sink 17. As an additional example, a ratchet mechanism may be employed so that the jaws may be advanced toward each other without restriction and then stepwise locked so that they cannot move apart from each other. As a further example, a fastener may comprise a cord or band that extends around both jaws so that when the length of the cord or band is shortened the jaws are advanced toward each other. FIG. 7C also shows how the shape of the various gripping surfaces can vary. For example, gripping surface 93 has an overall horizontal length 50 that is less than the length 95 of the gripping element 13 on which the gripping surface 93 is disposed. The length 50 of the gripping surface 93 can be made up of the horizontal length 51 of the contact region 54, plus the length 52 of a shoulder 53 positioned on either side of the contact region 54. Similarly, the gripping surface 83 has an overall horizontal length 55 that is less than the length 95 of the gripping element 13 on which the gripping surface 83 is disposed. The length 55 of the gripping surface 83 can be made up of the horizontal length 56 of the contact region 59, plus the length 57 of a shoulder 58 positioned on either side of the contact region 59. In some cases, as shown in FIGS. 7A-7C, the length of the shoulders 52 of the gripping surface 93 can be different (e.g., larger) than the length of the shoulders 57 of the gripping surface 83. As a result, if the overall horizontal length 50 of the gripping surface 93 is substantially the same as the overall horizontal length 55 of the gripping surface 83, the horizontal length 51 of the contact region 54 can be less than the horizontal length 56 of the contact region 59. In such a case, other features (e.g., curvature, vertical height) of the contact region 54 can vary from those features of the contact region 59. In any case, a contact region (e.g., contact region 54, contact region 59) of a gripping surface (e.g., gripping surface 93, gripping surface 83) is where the cable is disposed, and so the overall horizontal length of a gripping surface, which is less than the length 95 of the gripping element of the gripping surface, is greater than the width of the cable. Thus, the orientation (also called a position) of the gripping element 13 relative to the cable can allow the gripping element 13 to be tailored to certain sizes (or ranges of sizes) of cable. For example, the position of the gripping elements 13 shown in FIG. 7C exposes gripping surface 83 to a large cable because the contact region 59 of the gripping surfaces 83 has, for example, a larger horizontal length 56 and a smaller curvature. If the position of one or both of the gripping elements 13 is inverted, so that gripping surface 93 of each gripping element 13 is exposed to the cable, the cable would be relatively small because the contact region 54 of the gripping surface 93 has, for example, a smaller horizontal length 51 and a larger curvature. In certain example embodiments, each gripping element can have two gripping surfaces that are different from one or both of the gripping surfaces of the other gripping element.

Figure 8D:
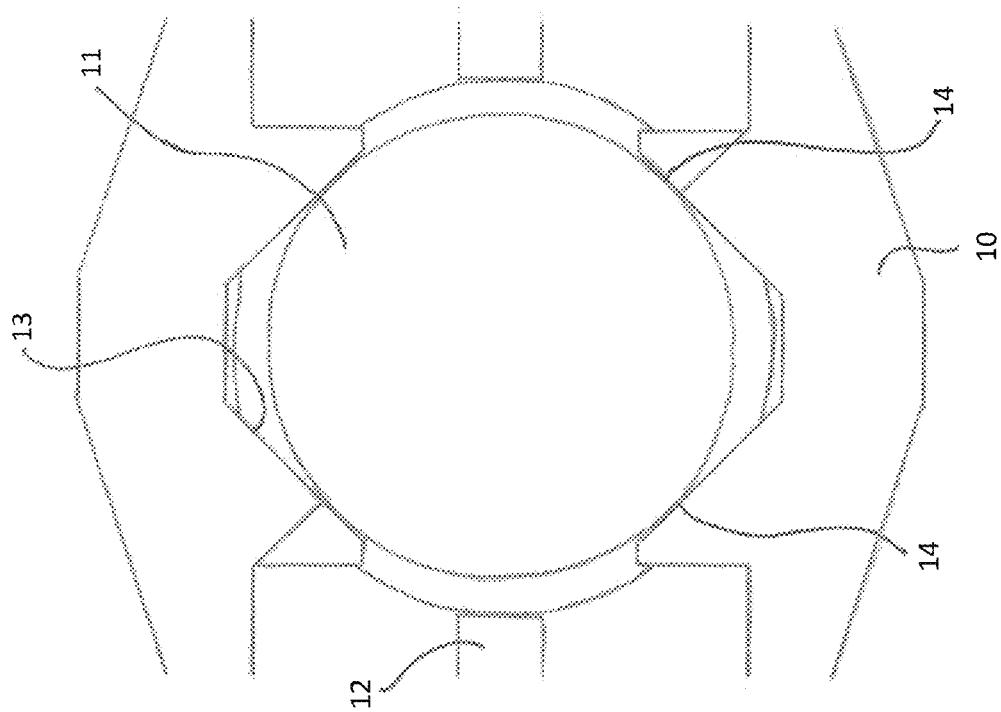
FIG. 8D shows an end view of the gripping device of FIG. 8A, wherein a large diameter cable is engaged in the jaws.
Figure 8C:
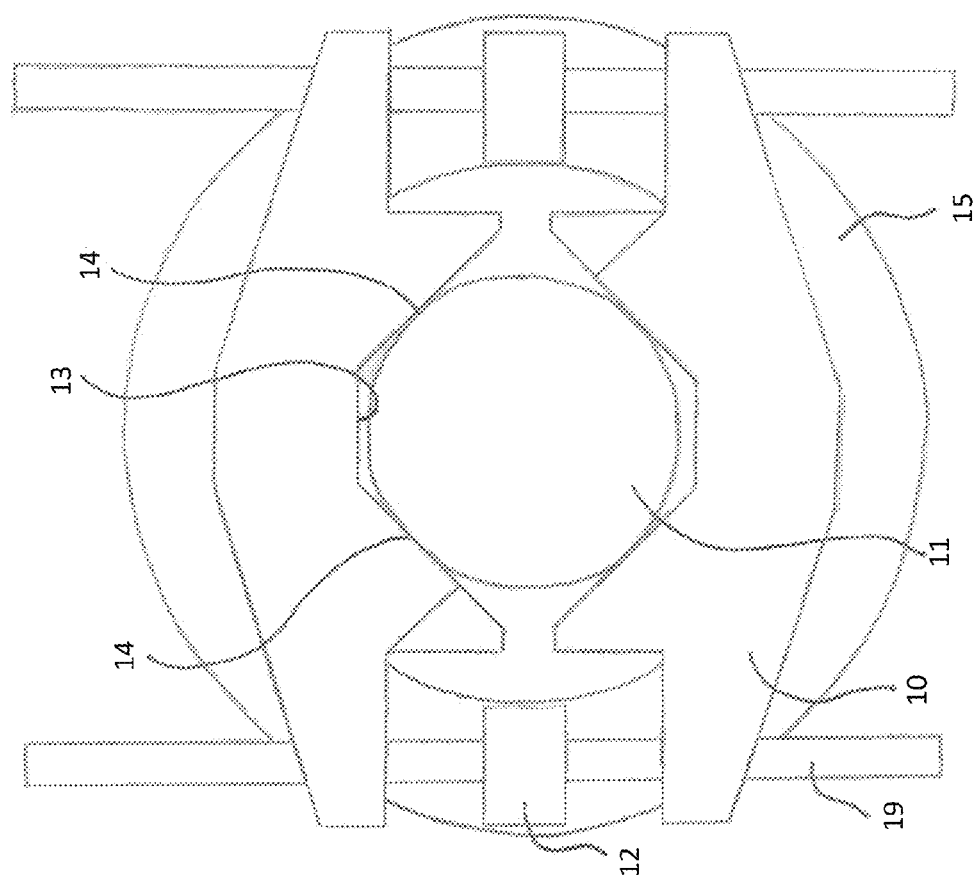
FIG. 8C shows an end view of the gripping device of FIG. 8A, wherein a medium diameter cable is engaged in the jaws.

Referring to FIGS. 8A-8D, a further illustrative example is shown. FIG. 8A, shows a perspective view of a gripping device 1 fastened to a gland nut 15. In this embodiment, two jaws 10 are fastened to the gland nut 15 via flanges 12 extending from the gland nut 15. Fasteners 19 extend through the jaws 10 and the flanges 12. Each jaw 10 has a gripping element 13. The lower jaw is shown in two positions, one position in the assembled configuration and the other position in the disassembled configuration. As more easily seen in the disassembled configuration, the jaws 10 are configured to interlock with each other, wherein a portion of the jaw is cut-away to allow the opposite jaw to extend into the cut-away portion when the jaws are advanced toward each other. FIG. 8B is an end view of the gripping device and gland nut, wherein the jaws 10 are advanced toward each other to the point that they are completely interlocked. In this configuration, the jaws are able to engage a cable 11 having a relatively smaller diameter. In this embodiment, the gripping element 13 makes one point of contact 14 with the cable 11. FIG. 8C shows the same gripping device engaging a medium-sized cable 11. With a medium-sized cable 11, each gripping element 13 makes two points of contact 14 with the cable 11. FIG. 8D shows the same gripping device engaging a large-sized cable 11. With a large-sized cable 11, each gripping element 13 makes two points of contact 14 with the cable 11.

Although the disclosed embodiments are described in detail in the present disclosure, it should be understood that various changes, substitutions and alterations can be made to the embodiments without departing from their spirit and scope.

What is claimed is:

1. A gripping device for gripping an electrical cable, comprising:
    a first jaw comprising a first plurality of gripping elements, wherein each of the first plurality of gripping elements comprises a first gripping surface disposed on a first side of each of the first plurality of gripping elements, wherein each of the first plurality of gripping surfaces has a length and a width, wherein the length is larger than the width, wherein each of the first plurality of gripping surfaces is substantially parallel to each other along the length, and wherein each gripping surface of the first plurality of gripping surfaces has a first continuous physical separation along the length from an adjacent gripping surface of the first plurality of gripping surfaces, wherein the first gripping surfaces comprise a first region configured to receive the electrical cable substantially perpendicular to the length of the first plurality of gripping surfaces, and wherein the length of each of the first plurality of gripping surfaces is greater than a cable width of the electrical cable that the first region is configured to receive;
    a second jaw comprising a second plurality of gripping elements, wherein each of the second plurality of gripping elements comprises a second gripping surface disposed on a first side of each of the second plurality of gripping elements, wherein each of the first plurality of gripping surfaces has the length and the width, wherein the length is larger than the width, wherein each of the second plurality of gripping surfaces is substantially parallel to each other, and wherein each gripping surface of the second plurality of gripping surfaces has a second continuous physical separation along the length from an adjacent gripping surface of the second plurality of gripping surfaces, wherein the second gripping surfaces comprise a second region configured to receive the electrical cable substantially perpendicular to the length of the second plurality of gripping surfaces, and wherein the length of each of the second plurality of gripping surfaces is greater than the cable width of the electrical cable that the second region is configured to receive; and
    at least one fastener for fastening the first and second jaws to each other,
    wherein each of the first gripping surfaces of the first plurality of gripping elements and each of the second gripping surfaces of the second plurality of gripping elements are configured to make at least two points of contact with the electrical cable,
    wherein each of the first plurality of gripping elements of the first jaw further comprises a third gripping surface disposed on a second side of each of the first plurality of gripping elements opposite the first side of each of the first plurality of gripping elements, wherein each of the third plurality of gripping surfaces is substantially parallel to each other, and wherein each gripping surface of the third plurality of gripping surfaces has a third continuous physical separation along the length from an adjacent gripping surface of the third plurality of gripping surfaces, wherein the third gripping surfaces comprise a third region that is configured to receive the electrical cable substantially perpendicular to the length of the third plurality of gripping surfaces, and
    wherein the first jaw further comprises a first fastener receiver and a second fastener receiver, wherein the first fastener receiver comprises a first receiving configuration disposed proximate to the first plurality of gripping surfaces and a second receiving configuration disposed proximate to the third plurality of gripping surfaces, and wherein the second fastener receiver comprises the second receiving configuration disposed proximate to the first plurality of gripping surfaces and the first receiving configuration disposed proximate to the third plurality of gripping surfaces.

2. The gripping device according to claim 1, wherein each first gripping surface of the first plurality of gripping elements and each second gripping surface of the second plurality of gripping elements comprises a flat surface.

3. The gripping device according to claim 1, wherein each first gripping surface of the first plurality of gripping elements and each second gripping surface of the second plurality of gripping elements comprises a convex surface.

4. The gripping device according to claim 1, wherein each first gripping surface of the first plurality of gripping elements and each second gripping surface of the second plurality of gripping elements comprises a concave surface.

5. The gripping device according to claim 1, wherein the first plurality of gripping surfaces forms a first interface configuration, wherein the second plurality of gripping surfaces forms a second interface configuration, and wherein the third plurality of gripping surfaces forms a third interface configuration.

6. The gripping device according to claim 5, wherein the first jaw has a first position and a second position, wherein the first plurality of gripping surfaces of the first jaw contacts the electrical cable when the first jaw is in the first position, and wherein the third plurality of gripping surfaces of the first jaw contacts the electrical cable when the first jaw is in the second position.

7. The gripping device according to claim 1, wherein the second jaw further comprises a third fastener receiver and a fourth fastener receiver, wherein the third fastener receiver comprises the second receiving configuration disposed proximate to the second plurality of gripping surfaces and the first receiving configuration disposed proximate to a fourth plurality of gripping surfaces, and wherein the fourth fastener receiver comprises the first receiving configuration disposed proximate to the second plurality of gripping surfaces and the second receiving configuration disposed proximate to the fourth plurality of gripping surfaces.

8. The gripping device according to claim 7, wherein the at least one fastener comprises a first fastener and a second fastener, wherein the first fastener engages the first receiving configuration of the first jaw and the second receiving configuration of the second jaw, and wherein the second fastener engages the second receiving configuration of the first jaw and the first receiving configuration of the second jaw.

9. The gripping device according to claim 1, wherein the first receiving configuration is a hex head countersink, and wherein the second receiving configuration is a circular countersink.

10. The gripping device of claim 1, wherein the first fastener receiver comprises first mating threads, and wherein the at least one fastener comprises second mating threads that complement the first mating threads.

11. The gripping device of claim 10, wherein the second fastener receiver comprises the first mating threads.

12. The gripping device of claim 1, wherein the at least one fastener is disposed within the first fastener receiver at an angle that is substantially perpendicular to the width of the first plurality of gripping surfaces.

13. The gripping device of claim 12, wherein the first fastener receiver is positioned at a first end of the first plurality of gripping elements, and wherein the second fastener receiver is positioned at a second end of the first plurality of gripping elements.

14. The gripping device of claim 1, wherein the first continuous separation and the second continuous separation are substantially identical to each other.

15. The gripping device of claim 1, wherein the first continuous separation and the third continuous separation are substantially identical to each other.

* * * * *